(12) United States Patent
Bai et al.

(10) Patent No.: US 11,948,494 B2
(45) Date of Patent: Apr. 2, 2024

(54) DRIVER CHIP AND DISPLAY DEVICE

(71) Applicants: Chongqing BOE Optoelectronics Technology Co., Ltd., Chongqing (CN); BOE Technology Group Co., Ltd., Beijing (CN)

(72) Inventors: Yajie Bai, Beijing (CN); Zhuo Xu, Beijing (CN); Jingpeng Zhao, Beijing (CN); Wentao Zhu, Beijing (CN)

(73) Assignees: Chongqing BOE Optoelectronics Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 61 days.

(21) Appl. No.: 17/761,995

(22) PCT Filed: May 17, 2021

(86) PCT No.: PCT/CN2021/094135
§ 371 (c)(1),
(2) Date: Mar. 18, 2022

(87) PCT Pub. No.: WO2021/238704
PCT Pub. Date: Dec. 2, 2021

(65) Prior Publication Data
US 2022/0335877 A1    Oct. 20, 2022

(30) Foreign Application Priority Data
May 26, 2020   (CN) .......................... 202010452340.3

(51) Int. Cl.
*G09G 3/20* (2006.01)
(52) U.S. Cl.
CPC ... *G09G 3/2092* (2013.01); *G09G 2300/0426* (2013.01); *G09G 2354/00* (2013.01)

(58) Field of Classification Search
CPC ......... G09G 3/2092; G09G 2300/0426; G09G 2354/00
See application file for complete search history.

(56) References Cited

U.S. PATENT DOCUMENTS

| | | | |
|---|---|---|---|
| 2005/0219150 A1* | 10/2005 | Park ..................... | G09G 3/3685 345/4 |
| 2007/0007650 A1* | 1/2007 | Tsukiji ................ | G02F 1/13452 257/737 |

(Continued)

FOREIGN PATENT DOCUMENTS

| | | |
|---|---|---|
| CN | 1719602 A | 1/2006 |
| CN | 101308262 A | 11/2008 |

(Continued)

OTHER PUBLICATIONS

CN202010452340.3 first office action.

*Primary Examiner* — Roy P Rabindranath
(74) *Attorney, Agent, or Firm* — IPro, PLLC

(57) ABSTRACT

Disclosed in embodiments of the present disclosure are a driver chip and a display device. The driver chip includes two opposite long edges, and two opposite short edges connected to the long edges; the driver chip includes multiple output pins and multiple input pins; the output pins are close to one of the long edges; the input pins include first input pins, second input pins, and third input pins; the first input pins are close to the long edge opposite to the output pins; the second input pins are close to the short edges; the third input pins are close to the long edge and located on both sides of the output pins.

18 Claims, 4 Drawing Sheets

(56) References Cited

U.S. PATENT DOCUMENTS

| | | | |
|---|---|---|---|
| 2008/0284770 A1 | 11/2008 | Kwak et al. | |
| 2010/0053057 A1* | 3/2010 | Chung | G09G 3/3685 |
| | | | 327/108 |
| 2014/0029226 A1 | 1/2014 | Abe et al. | |
| 2017/0103975 A1 | 4/2017 | Wu et al. | |
| 2017/0212636 A1* | 7/2017 | Kim | G09G 3/2092 |
| 2019/0107271 A1 | 4/2019 | Lin | |
| 2021/0201718 A1* | 7/2021 | Ha | G09G 3/32 |

FOREIGN PATENT DOCUMENTS

| | | |
|---|---|---|
| CN | 103576350 A | 2/2014 |
| CN | 104979326 A | 10/2015 |
| CN | 106571116 A | 4/2017 |
| CN | 110221462 A | 9/2019 |
| CN | 110288911 A | 9/2019 |
| CN | 110738934 A | 1/2020 |

\* cited by examiner

DRIVER CHIP AND DISPLAY DEVICE

CROSS-REFERENCE TO RELATED APPLICATIONS

The present disclosure is a National Stage of International Application No. PCT/CN2021/094135, filed May 17, 2021, which claims priority to Chinese Patent Application No. 202010452340.3, entitled "DRIVER CHIP AND DISPLAY DEVICE", filed to the China National Intellectual Property Administration on May 26, 2020, the entire contents of which are incorporated herein by reference.

FIELD

The present disclosure relates to the technical field of display, in particular to a driver chip and a display device.

BACKGROUND

With the development of a display technology, a Full In Cell technology of a touch display panel has the advantages of a better touch function, lighter and thinner products, lower overall power consumption, high board technology integration, simple module process and the like, so that the development of this technology has become one of important research and development directions.

SUMMARY

Embodiments of the present disclosure provide a driver chip, including: two opposite long edges, and two opposite short edges connected to the long edges, and the driver chip includes: a plurality of output pins and a plurality of input pins;
 the plurality of output pins are close to one of the long edges;
 the plurality of input pins include: first input pins, second input pins and third input pins;
 the first input pins are close to the other long edge opposite to the plurality of output pins;
 the second input pins are close to the short edges; and
 the third input pins are close to one of the long edges and arranged on both sides of the plurality of output pins.

In some embodiments, the first input pins are configured to input data signals;
 the second input pins are configured to input power signals; and
 the third input pins are configured to input one or a combination of following signals: gamma signals, common voltage signals and gate drive circuit configuration signals.

In some embodiments, the data signals include display data signals and touch data signals; and
 the plurality of output pins include: display data signal output pins and touch data signal output pins, and the display data signal output pins and the touch data signal output pins are arranged in an extending direction of the long edges respectively.

In some embodiments, the driver chips further include: a plurality of gate drive signal input pins, and a plurality of gate drive signal output pins electrically connected to the gate drive signal input pins in a one-to-one corresponding mode; and
 the gate drive signal input pins and the gate drive signal output pins are close to one of the long edges and arranged on both sides of the third input pins respectively.

In some embodiments, the driver chips further include: level control signal input pins and a level switching circuit;
 the level control signal input pins are close to one of the long edges, and arranged on one side, facing away from the output pins, of the gate drive signal input pins;
 the level switching circuit is electrically connected with the level control signal input pins, the gate drive signal input pins and the gate drive signal output pins; and
 the level switching circuit is configured to: perform level switching, according to level control signals input by the level control signal input pins, on gate drive signals input by the gate drive signal input pins, and then output the gate drive signals from the gate drive signal output pins.

In some embodiments, the driver chips include two groups of input pins; and the two groups of input pins are symmetrically arranged along a symmetry axis, perpendicular to the long edges, of the driver chip.

Embodiments of the present disclosure provide a display device, including: a display substrate, including a display area and a non-display area outside the display area, the display substrate is provided with first signal lines extending from the display area to the non-display area;
 a plurality of driver chips provided by embodiments of the present disclosure, bind to the non-display area of the display substrate, output pins of the plurality of driver chips are electrically connected with the first signal lines; and
 a plurality of flexible printed circuits, located in the non-display area of the display substrate, wherein the flexible printed circuits are electrically connected with input pins of the plurality of driver chips.

In some embodiments, in the non-display area, the display substrate includes: gate drive circuits on both sides of the display area in a first direction;
 the plurality of driver chips are arranged on one side of the display area in a second direction, and the first direction intersects with the second direction;
 the plurality of driver chips are arranged in the first direction, and in the first direction, first one of the plurality of driver chips and last one of the plurality of driver chips are electrically connected with the gate drive circuits respectively; and
 the driver chips electrically connected with the gate drive circuits include: gate drive signal input pins and gate drive signal output pins, the flexible printed circuits are electrically connected with the gate drive signal input pins, and the gate drive circuits are electrically connected with the gate drive signal output pins.

In some embodiments, the driver chips electrically connected with the gate drive circuits further include level control signal input pins, and the plurality of flexible printed circuits are electrically connected with the level control signal input pins.

In some embodiments, each of the plurality of flexible printed circuits is electrically connected with two of the plurality of driver chips.

DETAILED DESCRIPTION OF THE EMBODIMENTS

In order to make the purpose, technical solutions and advantages of the embodiments of the present disclosure clearer, the technical solutions of the embodiments of the present disclosure will be clearly and completely described below with reference to the accompanying drawings of the embodiments of the present disclosure. Obviously, the described embodiments are some, but not all, embodiments of the present disclosure. Based on the embodiments in the present disclosure, all other embodiments acquired by those of ordinary skill in the art without creative work shall fall within the protection scope of the present disclosure.

Unless otherwise defined, technical or scientific terms used herein should have the ordinary meaning as understood by one of ordinary skill in the art to which this disclosure belongs. The terms "first", "second" and the like used in the description and claims of the present disclosure do not denote any order, quantity or importance, but are only used to distinguish different components. "Comprise" or "include" and similar words mean that the elements or objects appearing before the word encompass the elements or objects recited after the word and their equivalents, but do not exclude other elements or objects. Similar words such as "connect" or "connected" are not limited to physical or mechanical connection, but may include electrical connection, whether direct or indirect. "Up", "down", "left", "right" and the like are only used to indicate the relative positional relationship, and when the absolute position of the described object changes, the relative positional relationship may also change accordingly.

In order to keep the following description of the embodiments of the present disclosure clear and concise, the present disclosure omits detailed descriptions of well-known functions and well-known components.

At present, high-end touch products adopt the Full in cell touch scheme to realize more beneficial touch functions. In this scheme, a display screen is driven by a touch display driver IC. The touch display driver IC includes a display function and a touch read-out function. The specific signal routing design of the Touch Display Driver IC is as follows: input pins and output pins of the touch display driver IC are only distributed in a long side direction of the touch display driver IC, data signals, touch signals, gamma signals and common voltage signals provided by a flexible printed circuit (FPC) all enter the touch display driver IC from the lower part of the touch display driver IC, which is bound to require a relatively large wiring space, resulting in a large lower bezel of the display screen, which is not conductive to the realization of super-narrow bezel display.

To sum up, the design method of the touch display driver IC in the related art requires the relatively large wiring space outside the touch display driver IC, which is not conductive to the realization of super-narrow bezel display.

Figure 1:
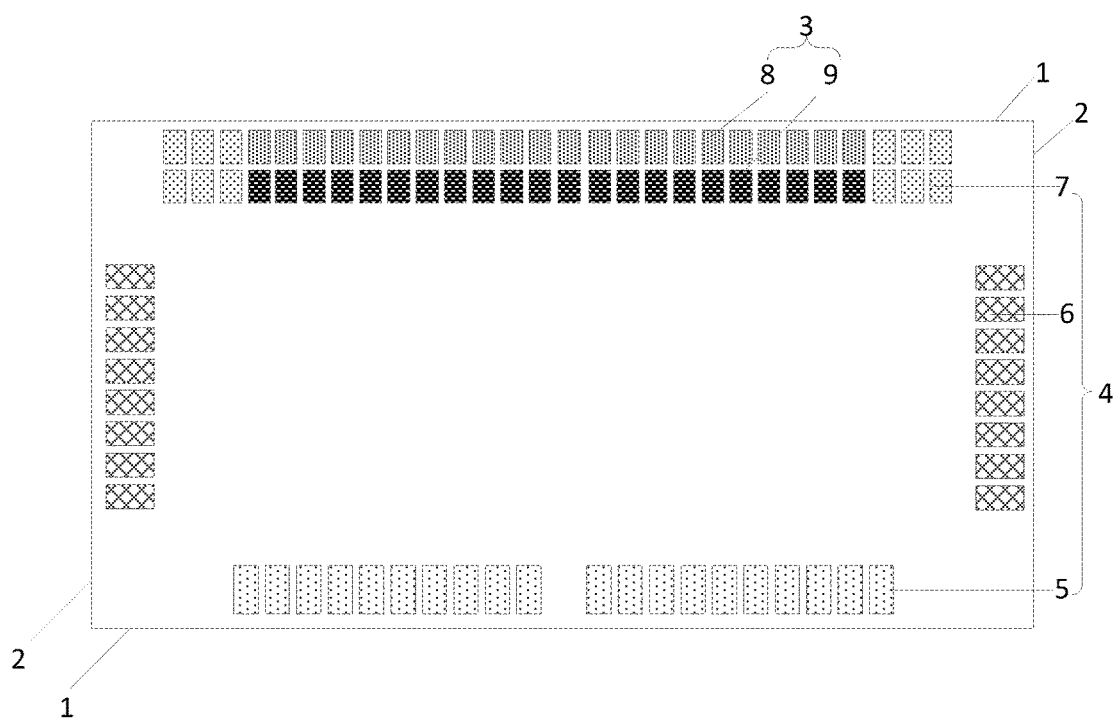
FIG. 1 is a schematic structural diagram of a driver chip provided by an embodiment of the present disclosure.

In view of this, embodiments of the present disclosure provide a driver chip, as shown in FIG. 1, including: two opposite long edges 1, and two opposite short edges 2 connected to the long edges 1; the driver chip includes: a plurality of output pins 3 and a plurality of input pins 4;

the plurality of output pins 3 are close to one of the long edges 1;

the plurality of input pins 4 include: first input pins 5, second input pins 6 and third input pins 7;

the first input pins 5 are close to the other long edge opposite to the plurality of output pins 3;

the second input pins 6 are close to the short edges 2; and the third input pins 7 are close to one of the long edges 1 and arranged on both sides of the plurality of output pins 3.

It should be noted that the driver chip provided by the embodiment of the present disclosure generally has a rectangular shape, and a length of the long edges is greater than that of the short edges.

In the driver chip provided by the embodiment of the present disclosure, the arrangement of its input pins is In some embodiments designed, the first input pins and the third input pins are arranged in areas close to the two opposite long edges of the driver chip respectively, and the second input pins are arranged in areas close to the short edges of the driver chip. When the driver chip provided by the embodiment of the present disclosure is applied to a display product, spaces on one side of the short edges of the driver chip may be fully utilized for wiring, a wiring quantity of one side of one of the long edges where the first input pins are close is reduced, so that the wiring space of the side of one of the long edges where the first input pins are close can be reduced, and a bezel size of the display product can be reduced.

In some embodiments, the first input pins are generally configured to input data signals;

the second input pins are generally configured to input power signals; and the third input pins are generally configured to input one or a combination of the following signals: gamma signals, common voltage (VCOM) signals and gate drive circuit configuration signals.

In the driver chip provided by the embodiment of the present disclosure, a large quantity of data signal input pins need to be set, the first input pins close to one of the long edges input the data signals, and a space of the driver chip may be reasonably utilized. Moreover, in specific applications, for example, when the driver chip is electrically connected with a flexible printed circuit, the long edge provided with the first input pins is generally closer to the flexible printed circuit that provides the signals, the first input pins are very close to the flexible printed circuit, so that the data signals are input by the first input pins, and a distortion degree of original data signals can be reduced. In addition, the third input pins are located on the both sides of the output pins, and compared with the related art, gamma signal input pins are arranged on the long edge opposite to the output pins. In the present disclosure, the distance between the gamma signals input by the third input pins and the output pins is small, so that a structure and the arrangement space of a gamma signal generation circuit in the driver chip can be simplified.

Of course, in the specific implementation, the signals input by the second input pins and the third input pins may also be interchanged. The specific input signals of each input pin may be selected according to the actual needs.

In some embodiments, the data signals may include display data signals and touch data signals; and as shown in FIG. 1, the plurality of output pins 3 may include: display data signal output pins 8 and touch data signal output pins 9. In some embodiments, the display data signal output pins are configured to output the display data signals, and the touch data signal output pins are configured to output the touch data signals. The driver chip provided by the embodiment of the present disclosure is a display touch driver chip, which may be utilized to drive a panel with integrated touch display.

In some embodiments, as shown in FIG. 1, the display data signal output pins 8 and the touch data signal output pins 9 are arranged in an extending direction of the long edges 1 respectively. In some embodiments, the display data signal output pins 8 and the touch data signal output pins 9 are arranged in a row in the extending direction of the long edges 1 respectively, and the touch data signal output pins 9 may be located on one side, close to the first input pins 5, of the display data signal output pins 8.

In some embodiments, as shown in FIG. 1, the input pins 4 included in the driver chip may be divided into two groups; and the two groups of input pins 4 are symmetrically arranged along a symmetry axis, perpendicular to the long edges 1, of the driver chip. In some embodiments, the input pins 4 may be divided into a left group and a right group, two groups of symmetrical first input pins 5 are arranged in an area, close to one of the long edges 1, in the driver chip, one group of second input pins 6 are arranged on the two short edges 2 respectively, and one group of third input pins 7 are arranged on both sides of the output pins 3 respectively. In this way, it is convenient to manufacture the pins in the driver chip, and the pins that need to input signals may be selected according to the position of the driver chip and the wiring position of a signal line electrically connected with the driver chip in specific applications.

In some embodiments, when the driver chip needs to be electrically connected with a flexible printed circuit through the signal line, in order to facilitate the wiring of the signal line, the signals may be input only from one group of input pins 4, that is, the signals may be input from the left group of input pins 4 of the driver chip, or the signals may be input from the right group of input pins 4 of the driver chip. Of course, the signals may also be input from each group of input pins 4, for example, a part of the input pins in each group of input pins 4 may be used for inputting the signals.

Figure 2:
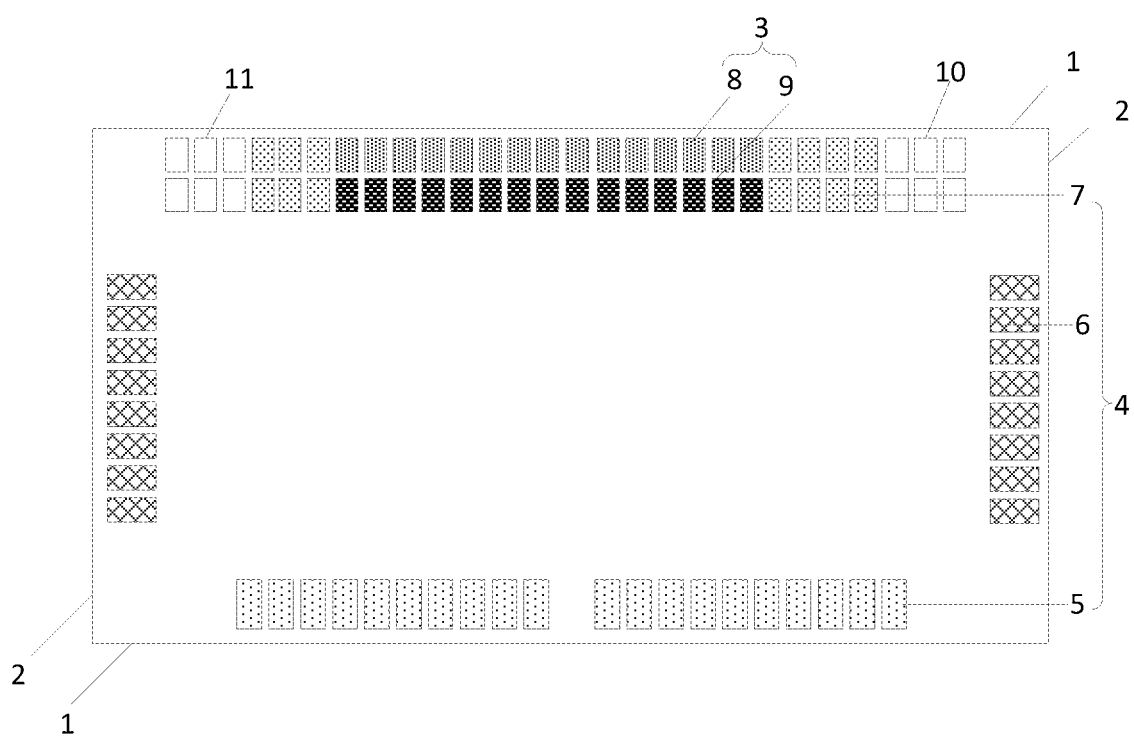
FIG. 2 is a schematic structural diagram of another driver chip provided by an embodiment of the present disclosure.

In some embodiments, as shown in FIG. 2, the driver chip may further include: a plurality of gate drive signal input pins 10, and a plurality of gate drive signal output pins 11 electrically connected to the gate drive signal input pins 10 in a one-to-one corresponding mode; and the gate drive signal input pins 10 and the gate drive signal output pins 11 are close to one of the long edges 1 and arranged on both sides of the third input pins 7 respectively.

It should be noted that in the display products provided by the related art, a gate drive circuit (GOA) is electrically connected with the flexible printed circuit outside the driver chip through signal lines, and some signal lines are usually electrically connected with the flexible printed circuit on sides, close to the long edges 1, of the first input pins 5. Therefore, a large wiring space needs to be designed on the sides, close to the long edges 1, of the first input pins 5, resulting in large bezels on the sides, provided with the driver chip and the flexible printed circuit, of the display products.

The driver chip provided by embodiments of the present disclosure is provided with the gate drive signal input pins 10 and the gate drive signal output pins 11, and the gate drive signal input pins 10 are electrically connected with the gate drive signal output pins 11 in the driver chip. Therefore, when the driver chip provided by the embodiment of the present disclosure is applied to the a display product, the gate drive circuit and the flexible printed circuit of the display product may realize signal transmission through the driver chip, the signal line of the gate drive circuit does not need to be wired on the sides, close to the long edges 1, of the first input pins 5, so that the wiring quantity of the sides, close to the long edges 1, of the first input pins 5 may be further reduced, the wiring space of the sides, close to the long edges, of the first input pins 5 may be reduced, so as to reduce the bezel size of the display product to realize a narrow bezel.

In some embodiments, the present disclosure only takes the driver chip shown in FIG. 2, in which the gate drive signal input pins 10 and the gate drive signal output pins 11 are arranged outside the third input pins 7. Of course, in the specific implementation, when the driver chip needs to be utilized to realize the transmission of gate drive signals, the gate drive signals may also be input by the second input pins on one side of the driver chip as shown in FIG. 1, and output from the second input pins on the other side, and the third input pins input power signals, gamma signals, common voltage (VCOM) signals and gate drive circuit configuration signals.

It is worth noting that in the driver chip shown in FIG. 2, taking that the gate drive signal input pins 10 are located on the right sides of the output pins 3, and the gate drive signal output pins 11 are located on the left sides of the output pins 3 as an example, in the specific implementation, the positions of the gate drive signal input pins 10 and the gate drive signal output pins 11 may also be interchanged, and the positions of the gate drive signal input pins 10 and the gate drive signal output pins 11 may also be selected according to the specific positions of the driver chip, the gate drive circuit and the flexible printed circuit and the arrangement of the signal line.

Figure 3:
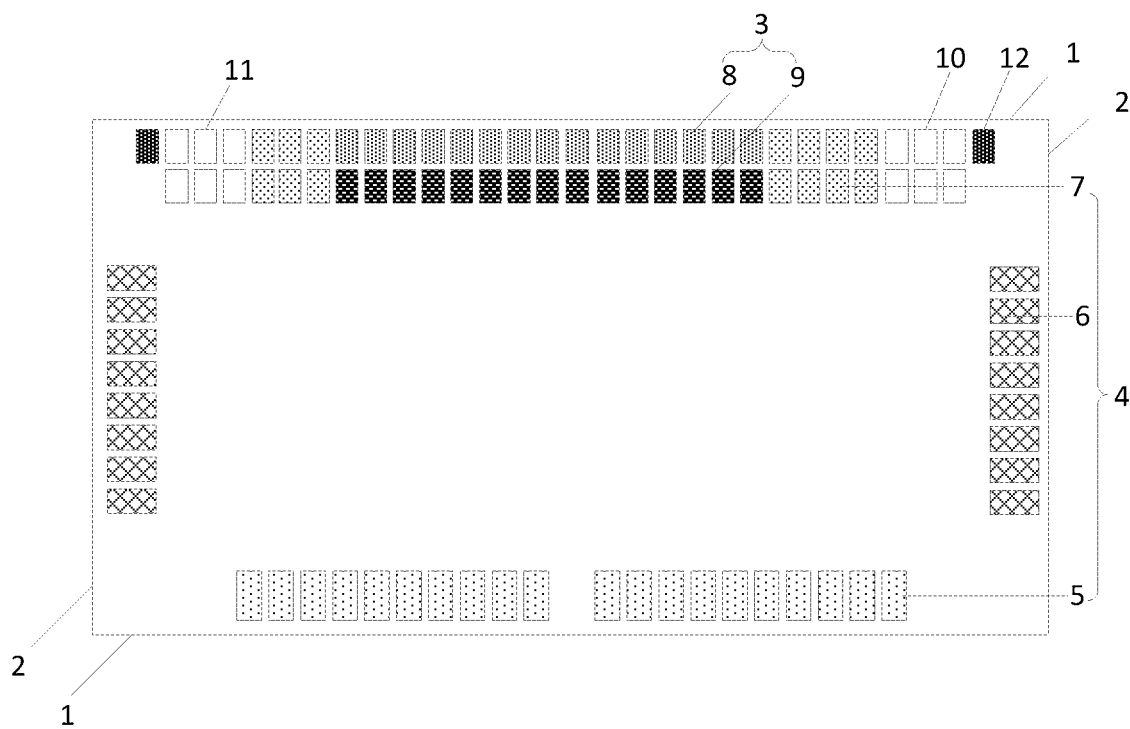
FIG. 3 is a schematic structural diagram of another driver chip provided by an embodiment of the present disclosure.
Figure 4:
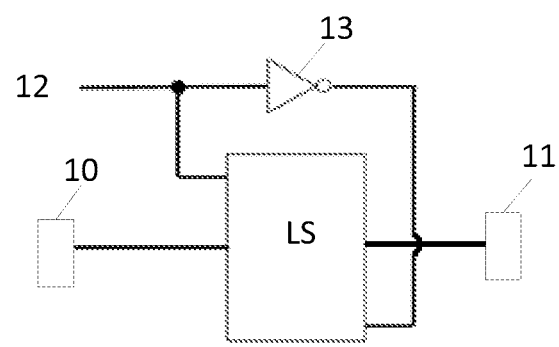
FIG. 4 is a schematic diagram of a level switching circuit in a driver chip provided by an embodiment of the present disclosure.

In some embodiments, as shown in FIG. 3 and FIG. 4, the driver chip may further include: level control signal input pins 12 and a level switching circuit LS;

the level control signal input pins 12 are close to one of the long edges 1, and located on one side, facing away from the third input pins 7, of the gate drive signal input pins 10;

the level switching circuit LS is electrically connected with the level control signal input pins 12, the gate drive signal input pins 10 and the gate drive signal output pins 11; and the level switching circuit LS is configured to: perform level switching, according to level control signals input by the level control signal input pins 12, on gate drive signals input by the gate drive signal input pins 10, and then output the gate drive signals from the gate drive signal output pins 11.

In some embodiments, a function of level switching is integrated, which may deal with the transmission of the gate drive signals, and may also perform boost processing on the gate drive signals with low levels, so that the gate drive signals output from the driver chip may meet the driving needs of the display products.

It should be noted that as shown in FIG. 3, in order to facilitate the manufacture of the pins of the driver chip, the level control signal input pins 12 may also be arranged as two symmetrical groups on both sides of the output pins 3 respectively, but in practical applications, the level control signals are input by the pins only on one side.

As shown in FIG. 4, the level control signals (control) are input from a first input end of the level switching circuit LS, the level control signals (control) are input from a second input end of the level switching circuit LS through signals of a phase inverter 13, original gate drive signals are input to a third input end of the level switching circuit LS through the gate drive signal input pins 10, and the gate drive signals after level switching are output to the gate drive signal output pins 11 from an output end of the level switching circuit LS. FIG. 4 takes that the original gate drive signals are input from the left side of the level switching circuit LS as an example for distance description. In this case, the level control signals (control) are high-level signals. In the specific implementation, the gate drive signal input pins 10 and the gate drive signal output pins 11 may also be opposite to the setting in FIG. 4, that is, the original gate drive signals are input from the right side of the level switching circuit LS. In this case, the level control signals (control) are low-level signals.

Figure 5:
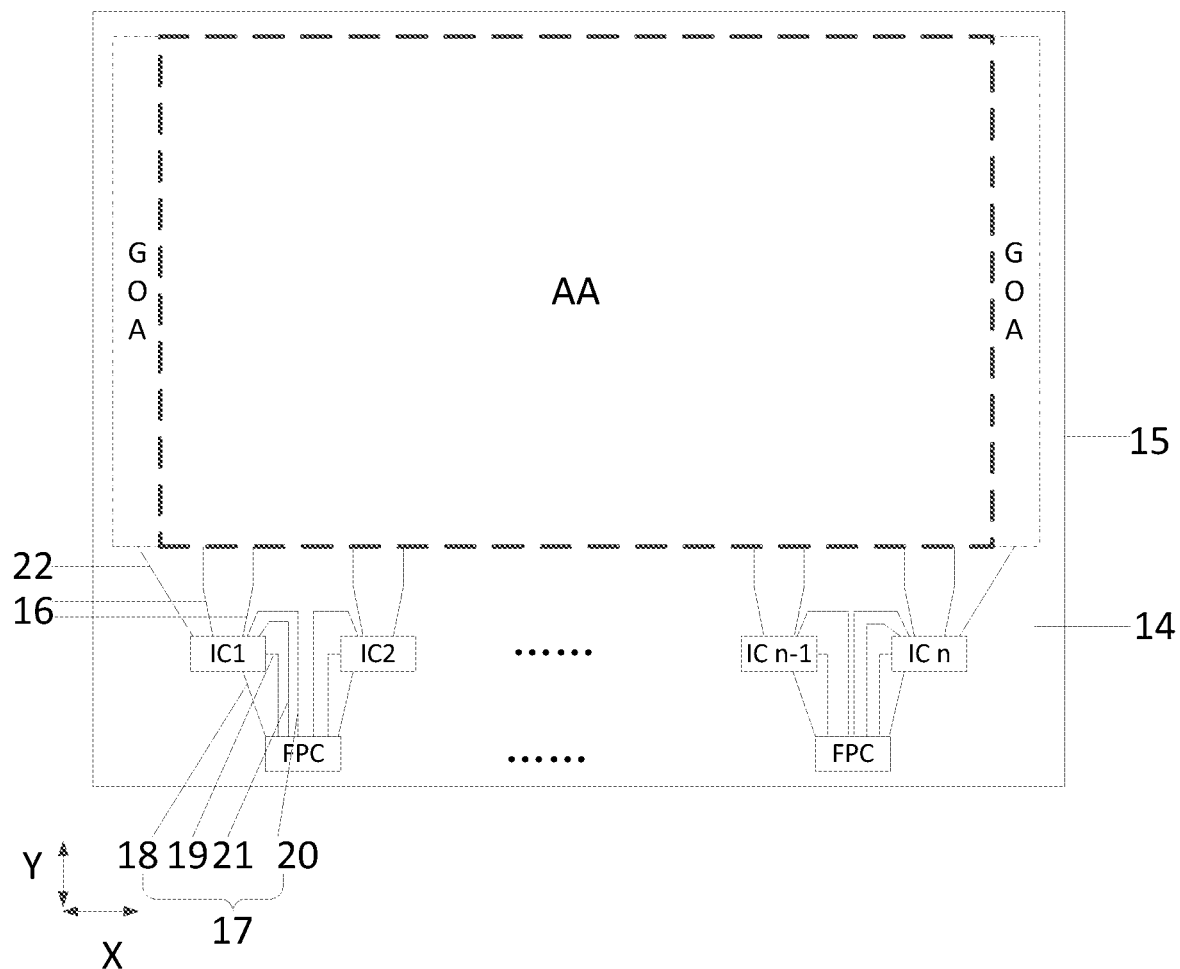
FIG. 5 is a schematic structural diagram of a display device provided by an embodiment of the present disclosure.

Based on the same inventive concept, embodiments of the present disclosure further provide a display device. As shown in FIG. 5, the display device includes:

- a display substrate 15, divided into a display area AA and a non-display area 14 outside the display area AA; the display substrate 15 is provided with first signal lines 16 extending from the display area AA to the non-display area 14;
- a plurality of driver chips IC provided by embodiments of the present disclosure, bind to the display substrate 15 in the non-display area 14, and output pins of the plurality of driver chips IC are electrically connected with the first signal lines 16; and
- a plurality of flexible printed circuits FPC in the non-display area 14, and the flexible printed circuits FPC are electrically connected with input pins of the plurality of driver chips IC through a second signal line 17.

It should be noted that in order to facilitate the illustration of the composition of the display device provided by the present disclosure and the positional relationship of each component, the pins of the driver chip IC are not shown in FIG. 5. As for the arrangement mode of the pins in the driver chip IC, please refer to the specific embodiments of the driver chip, which will not be repeated here.

It should be noted that each signal line in FIG. 5 is only to clearly show the connection relationship of each part of the display device, and a quantity of each signal line does not represent an actual quantity.

In some embodiments, a quantity of the driver chip may be actually selected according to a quantity of the first signal line of the display substrate, and each pin in the driver chip may also be set according to the quantity of each signal line.

The display device provided by the embodiment of the present disclosure includes the driver chip provided by the embodiment of the present disclosure, the first input pins and the third input pins are arranged in areas close to the two opposite long edges of the driver chip respectively, and the second input pins are arranged in areas close to the short edges of the driver chip, so that the flexible printed circuit is electrically connected with the driver chip through the second signal line. The spaces on one side of the short edges of the driver chip may be fully utilized for wiring, and the wiring quantity of one side of the long edges where the first input pins are close is reduced, so that the wiring space of the sides of the long edges where the first input pins are close can be reduced, and the size of the non-display area of the display device can be reduced to realize the narrow bezel.

The display device, the flexible printed circuit and the gate drive circuit provided by the embodiment of the present disclosure realize the transmission of the gate drive signals through the gate drive signal input pins and the gate drive signal output pins which are arranged in the driver chip, and fully utilize the areas covered by the driver chip for wiring of the signal lines that transmit the gate drive signals, the signal lines that electrically connect the gate drive circuit with the flexible printed circuit do not need to be arranged on the sides, close to the long edges, of the first input pins, so that the wiring quantity of the sides, close to the long edges, of the first input pins can be further reduced, the wiring space of the sides, close to the long edges, of the first input pins can be reduced, and therefore, the size of the non-display area of the display device can be reduced so as to realize the narrow bezel of the display device.

In some embodiments, as shown in FIG. 5, the second signal line 17 may include: a first sub-signal line 18 electrically connected with the first input pins, a second sub-signal line 19 electrically connected with the second input pins, and a third sub-signal line 20 electrically connected with the third input pins.

In some embodiments, in the display device provided by the embodiment of the present disclosure, the space of the side, close to the flexible printed circuit, of the driver chip, the space on the side face of the driver chip and the space of a fanout area between the driver chip and the display substrate are fully utilized for reasonable wiring of the second signal line, the wiring space of the sides, close to the long edges, of the first input pins can be reduced, and therefore, the size of the non-display area of the display device so as to realize the narrow bezel of the display device.

In some embodiments, as shown in FIG. 5, in the non-display area 14, the display substrate 15 may include: gate drive circuits GOA located on both sides of the display area AA in a first direction X;

- the plurality of driver chips IC are located on one side of the display area AA in a second direction Y, and the first direction X intersects with the second direction Y;
- the plurality of driver chips IC are arranged in the first direction X, and in the first direction X, first one of the plurality of driver chip IC1 and last one of the plurality of driver chip ICn are electrically connected with the gate drive circuits GOA respectively; and
- the driver chips IC electrically connected with the gate drive circuits GOA include: gate drive signal input pins and gate drive signal output pins, the flexible printed circuits FPC are electrically connected with the gate drive signal input pins, and the gate drive circuits GOA are electrically connected with the gate drive signal output pins.

It should be noted that in the plurality of driver chips, only the first driver chip and the last driver chip in the arrangement direction of the driver chips are electrically connected with the gate drive circuits located on both sides of the display area respectively, only the first driver chip IC1 and the last driver chip ICn are electrically connected with the gate drive circuits GOA, and the driver chips between the first driver chip IC1 and the last driver chip ICn do not need to be electrically connected with the gate drive circuits GOA. For the driver chips between the first driver chip IC1 and the last driver chip ICn, high-level signals or low-level signals may be provided to short-circuit their internal gate drive signal input pins and gate drive signal output pins.

In some embodiments, as shown in FIG. 5, the second signal line 17 may further include a fourth sub-signal line 21 electrically connected with the gate drive signal input pins of the driver chips IC. The gate drive circuits GOA are electrically connected with the gate drive signal output pins of the driver chips IC through a third signal line 22.

In some embodiments, when the driver chip electrically connected with the gate drive circuits GOA further has a level switching function, the driver chip includes level control signal input pins and a level switching circuit, and the flexible printed circuits are further electrically connected with the level control signal input pins.

In some embodiments, as shown in FIG. 5, each of the plurality of flexible printed circuit FPC may be electrically connected with two driver chips IC.

In some embodiments, when each driver chip includes two groups of input pins, for the two driver chips connected with each flexible printed circuit, taking the first driver chip IC1 and a second driver chip IC2 in FIG. 5 as an example, the flexible printed circuit FPC may be electrically connected with one group of input pins on the right side of the first driver chip IC1, and the flexible printed circuit FPC may be electrically connected with one group of input pins on the left side of the second driver chip IC2.

To sum up, in the driver chip and the display device provided by the embodiments of the present disclosure, the arrangement of the pins is designed, the first input pins and the third input pins are arranged in the areas close to the two opposite long edges of the driver chip respectively, and the second input pins are further arranged in the areas close to the short edges of the driver chip. When the driver chip is applied to a display product, the spaces on one side of the short edges of the driver chip may be fully utilized for wiring, the wiring quantity of one side of the long edges where the first input pins are close is reduced, so that the wiring space of the sides of the long edges where the first input pins are close can be reduced, and the bezel size of the display product can be reduced so as to realize the narrow bezel.

Obviously, those skilled in the art can make various changes and modifications to the present disclosure without departing from the spirit and scope of the present disclosure. As such, provided that these modifications and variations of the present disclosure fall within the scope of the claims of the present disclosure and their equivalents, the present disclosure is also intended to cover such modifications and variations.

What is claimed is:

1. A driver chip, comprising: two opposite long edges, and two opposite short edges connected to the long edges, wherein the driver chip comprises: a plurality of output pins and a plurality of input pins;
    the plurality of output pins are close to one of the long edges;
    the plurality of input pins comprises: first input pins, second input pins and third input pins;
    the first input pins are close to the other long edge opposite to the plurality of output pins;
    the second input pins are close to the short edges; and
    the third input pins are close to one of the long edges and arranged on both sides of the plurality of output pins;
    wherein the driver further comprises: a plurality of gate drive signal input pins, and a plurality of gate drive signal output pins electrically connected to the gate drive signal input pins in a one-to-one corresponding mode;
    wherein the gate drive signal input pins and the gate drive signal output pins are close to one of the long edges and arranged on both sides of the third input pins, respectively.

2. The driver chip according to claim 1, wherein the first input pins are configured to input data signals;
    the second input pins are configured to input power signals; and
    the third input pins are configured to input one or a combination of following signals: gamma signals, common voltage signals and gate drive circuit configuration signals.

3. The driver chip according to claim 2, wherein the data signals comprise display data signals and touch data signals;
    the plurality of output pins comprises: display data signal output pins and touch data signal output pins; and
    the display data signal output pins and the touch data signal output pins are arranged in an extending direction of the long edges, respectively.

4. The driver chip according to claim 3, wherein the touch data signal output pins are arranged on one side, close to the first input pins, of the display data signal output pins.

5. The driver chip according to claim 1, further comprising: level control signal input pins and a level switching circuit; wherein
    the level control signal input pins are close to one of the long edges, and arranged on one side, facing away from the plurality of output pins, of the gate drive signal input pins;
    the level switching circuit is electrically connected with the level control signal input pins, the gate drive signal input pins and the gate drive signal output pins; and
    the level switching circuit is configured to:
        perform level switching, according to level control signals input by the level control signal input pins, on gate drive signals input by the gate drive signal input pins, and
        output the gate drive signals from the gate drive signal output pins.

6. The driver chip according to claim 5, wherein the level control signal input pins are arranged as two groups on both sides of the plurality of output pins, respectively.

7. The driver chip according to claim 1, wherein the driver chip comprises two groups of input pins; and
    the two groups of input pins are symmetrically arranged along a symmetry axis, perpendicular to the long edges, of the driver chip.

8. A display device, comprising:
    a display substrate, comprising a display area and a non-display area outside the display area, wherein the display substrate is provided with first signal lines extending from the display area to the non-display area;
    a plurality of driver chips according to claim 1, bind to the non-display area of the display substrate, wherein output pins of the plurality of driver chips are electrically connected with the first signal lines; and
    a plurality of flexible printed circuits, in the non-display area of the display substrate, wherein the flexible printed circuits are electrically connected with input pins of the plurality of driver chips.

9. The display device according claim 8, wherein in the non-display area, the display substrate comprises: gate drive circuits on both sides of the display area in a first direction;
    the plurality of driver chips are located on one side of the display area in a second direction, and the first direction intersects with the second direction;
    the plurality of driver chips are arranged in the first direction, and in the first direction, first one of the plurality of driver chips and last one of the plurality of driver chips are electrically connected with the gate drive circuits, respectively; and
    the driver chips electrically connected with the gate drive circuits comprise: gate drive signal input pins and gate drive signal output pins, the flexible printed circuits are electrically connected with the gate drive signal input pins, and the gate drive circuits are electrically connected with the gate drive signal output pins.

10. The display device according to claim 9, wherein the driver chips electrically connected with the gate drive circuits further comprise level control signal input pins; and
the plurality of flexible printed circuits are electrically connected with the level control signal input pins.

11. The display device according to claim 9, wherein the gate drive circuits are electrically connected with the gate drive signal output pins of the driver chips through third signal lines.

12. The display device according to claim 8, wherein each of the plurality of flexible printed circuits is electrically connected with two of the plurality of driver chips.

13. The display device according to claim 8, wherein the plurality of flexible printed circuits are electrically connected with the input pins of the plurality of driver chips through second signal lines.

14. The display device according to claim 13, wherein the second signal lines include: first sub-signal lines electrically connected with the first input pins, second sub-signal lines electrically connected with the second input pins, and third sub-signal lines electrically connected with the third input pins.

15. The display device according to claim 8, wherein the first input pins are configured to input data signals;
the second input pins are configured to input power signals; and
the third input pins are configured to input one or a combination of following signals: gamma signals, common voltage signals and gate drive circuit configuration signals.

16. The display device according to claim 15, wherein the input data signals comprise display data signals and touch data signals;
the plurality of output pins comprises: display data signal output pins and touch data signal output pins; and
the display data signal output pins and the touch data signal output pins are arranged in an extending direction of the long edges, respectively.

17. The display device according to claim 8, wherein the driver chip: level control signal input pins and a level switching circuit;
the level control signal input pins are close to one of the long edges, and arranged on one side, facing away from the plurality of output pins, of the gate drive signal input pins;
the level switching circuit is electrically connected with the level control signal input pins, the gate drive signal input pins and the gate drive signal output pins; and
the level switching circuit is configured to:
perform level switching, according to level control signals input by the level control signal input pins, on gate drive signals input by the gate drive signal input pins, and
output the gate drive signals from the gate drive signal output pins.

18. The display device according to claim 8, wherein the driver chip comprises two groups of input pins; and
the two groups of input pins are symmetrically arranged along a symmetry axis, perpendicular to the long edges, of the driver chip.

* * * * *